US012699646B2

(12) United States Patent
Senchenko et al.

(10) Patent No.: US 12,699,646 B2
(45) Date of Patent: Aug. 4, 2026

(54) SYSTEM FOR IDENTIFYING VISUAL ANOMALIES AND CODING ERRORS WITHIN A VIDEO GAME

(71) Applicant: Electronic Arts Inc., Redwood City, CA (US)

(72) Inventors: Alexander Senchenko, Langley (CA); Milan Culibrk, Coquitlam (CA)

(73) Assignee: Electronic Arts Inc., Redwood City, CA (US)

( * ) Notice: Subject to any disclaimer, the term of this patent is extended or adjusted under 35 U.S.C. 154(b) by 294 days.

(21) Appl. No.: 18/618,184

(22) Filed: Mar. 27, 2024

(65) Prior Publication Data

US 2025/0307129 A1      Oct. 2, 2025

(51) Int. Cl.
*G06F 11/3698*      (2025.01)
*G06F 11/3668*      (2025.01)

(52) U.S. Cl.
CPC ...... *G06F 11/3698* (2025.01); *G06F 11/3688* (2013.01); *G06F 11/3692* (2013.01); *G06F 11/3696* (2013.01)

(58) Field of Classification Search
None
See application file for complete search history.

(56) References Cited

U.S. PATENT DOCUMENTS 4,313,200 A      1/1982   Nishiura
8,069,258 B1   11/2011   Howell 8,678,929 B1      3/2014   Nishimura et al.
9,396,702 B2      7/2016   Colenbrander
9,497,358 B2    11/2016   Colenbrander
9,912,562 B2      3/2018   Callahan
10,783,057 B2 *   9/2020   Beltran ................. A63F 13/355
(Continued)

FOREIGN PATENT DOCUMENTS

CN      101616720 A      12/2009
CN      104158696 A      11/2014
(Continued)

OTHER PUBLICATIONS

Taesiri, "A Video Game Testing Method Utilizing Deep Learning", 2020, CSI Journal (Year: 2020).*
(Continued)

*Primary Examiner* — Hossain M Morshed
(74) *Attorney, Agent, or Firm* — Knobbe, Martens, Olson & Bear, LLP

(57) ABSTRACT

A visual anomaly detection system can test a video game under test. The testing can involve applying captured video frames to a large language model using dynamically generated prompts. The captured video frames can be obtained directly from an output port of a user computing system enabling the video frames to be applied to the machine learning model without modification and with minimal to no user intervention. Additionally, the systems disclosed herein can control the user computing system hosting the video game under test enabling the test system to react to test results in real-time or near real-time (e.g., within milliseconds, while the video game is executing, before a next action is performed with respect to the video game, and the like) and to modify the testing process as tests are being performed.

20 Claims, 6 Drawing Sheets

(56) References Cited

U.S. PATENT DOCUMENTS

| | | | | |
|---|---|---|---|---|
| 10,949,325 | B1* | 3/2021 | Culibrk | G06F 11/3612 |
| 10,963,365 | B2 | 3/2021 | Phaneuf et al. | |
| 11,020,658 | B2 | 6/2021 | Phaneuf et al. | |
| 11,517,816 | B2 | 12/2022 | Phaneuf et al. | |
| 11,904,238 | B2 | 2/2024 | Phaneuf et al. | |
| 2002/0082065 | A1 | 6/2002 | Fogel et al. | |
| 2002/0082077 | A1 | 6/2002 | Johnson et al. | |
| 2005/0170891 | A1 | 8/2005 | Shim et al. | |
| 2006/0253741 | A1* | 11/2006 | Garakani | G06F 11/3692 |
| | | | | 714/38.11 |
| 2009/0012920 | A1 | 1/2009 | Kwok | |
| 2010/0124983 | A1 | 5/2010 | Gowin et al. | |
| 2010/0151926 | A1 | 6/2010 | Ruppert et al. | |
| 2010/0166058 | A1 | 7/2010 | Perlman et al. | |
| 2010/0166062 | A1 | 7/2010 | Perlman et al. | |
| 2010/0166063 | A1 | 7/2010 | Perlman et al. | |
| 2010/0166064 | A1 | 7/2010 | Perlman et al. | |
| 2010/0166065 | A1 | 7/2010 | Perlman et al. | |
| 2010/0166066 | A1 | 7/2010 | Perlman et al. | |
| 2010/0166068 | A1 | 7/2010 | Perlman et al. | |
| 2010/0167809 | A1 | 7/2010 | Perlman et al. | |
| 2010/0167816 | A1 | 7/2010 | Perlman et al. | |
| 2011/0107220 | A1 | 5/2011 | Perlman | |
| 2011/0122063 | A1 | 5/2011 | Perlman et al. | |
| 2011/0302454 | A1 | 12/2011 | Prophete et al. | |
| 2012/0069131 | A1 | 3/2012 | Abelow | |
| 2012/0071236 | A1 | 3/2012 | Ocko et al. | |
| 2012/0101799 | A1 | 4/2012 | Fernandes | |
| 2012/0172118 | A1 | 7/2012 | Shimamura et al. | |
| 2014/0213368 | A1 | 7/2014 | Jacob et al. | |
| 2014/0359558 | A1 | 12/2014 | Chamberlain | |
| 2015/0067819 | A1 | 3/2015 | Shribman et al. | |
| 2015/0181084 | A1 | 6/2015 | Colenbrander | |
| 2015/0281029 | A1 | 10/2015 | Callahan et al. | |
| 2016/0179730 | A1 | 6/2016 | Halleck et al. | |
| 2016/0180811 | A1 | 6/2016 | Colenbrander | |
| 2016/0256784 | A1 | 9/2016 | Schultz et al. | |
| 2016/0309140 | A1 | 10/2016 | Wang et al. | |
| 2016/0332081 | A1 | 11/2016 | Marr et al. | |
| 2017/0160796 | A1 | 6/2017 | Oto | |
| 2017/0312626 | A1 | 11/2017 | Colenbrander | |
| 2018/0001205 | A1 | 1/2018 | Osman et al. | |
| 2018/0071636 | A1 | 3/2018 | Bala | |
| 2018/0091392 | A1 | 3/2018 | Richards et al. | |
| 2018/0091394 | A1 | 3/2018 | Richards et al. | |
| 2018/0091401 | A1 | 3/2018 | Richards et al. | |
| 2018/0091413 | A1 | 3/2018 | Richards et al. | |
| 2018/0276111 | A1 | 9/2018 | Datta | |
| 2018/0349108 | A1 | 12/2018 | Brebner | |
| 2019/0004793 | A1 | 1/2019 | Brebner | |
| 2019/0129418 | A1 | 5/2019 | Swan et al. | |
| 2019/0134506 | A1 | 5/2019 | Gupta et al. | |
| 2019/0340866 | A1* | 11/2019 | Riggs | G07F 17/3276 |
| 2019/0349449 | A1 | 11/2019 | Shribman et al. | |
| 2020/0298108 | A1* | 9/2020 | Phaneuf | A63F 13/35 |
| 2020/0301814 | A1* | 9/2020 | Phaneuf | A63F 13/35 |
| 2021/0279167 | A1* | 9/2021 | Jose | G06F 11/3688 |
| 2021/0331066 | A1* | 10/2021 | Phaneuf | A63F 13/35 |
| 2022/0121561 | A1* | 4/2022 | Mayhew | G06F 11/3414 |
| 2023/0072888 | A1* | 3/2023 | Kim | G06F 16/7837 |
| 2025/0307129 | A1* | 10/2025 | Senchenko | G06F 11/3684 |

FOREIGN PATENT DOCUMENTS

| | | |
|---|---|---|
| CN | 105718363 A | 6/2016 |
| CN | 108704314 A | 10/2018 |
| CN | 111714875 A | 9/2020 |
| JP | 2012-139448 A | 7/2012 |
| KR | 10-2265017 | 6/2021 |

OTHER PUBLICATIONS

Wilkins, "A Metric Learning Approach to Anomaly Detection in Video Games", 2020, IEEE (Year: 2020).*

Albaghajati, "Video Game Automated Testing Approaches: An Assessment Framework", 2023, IEEE (Year: 2023).*

Conti et al., "A novel FPGA-based test-bench framework for SDI stream verification," EURASIP Journal on Image and Video Processing, 2020, pp. 1-16.

Huang et al., "Using Offline Bitstream Analysis for Power-Aware video Decoding in Portable Devices", pp. 299-302, 2005.

Singh, "Simple HDMI + VGA Framebuffer Design Example on Neso Artix 7 FPGA Board," Numato, Mar. 16, 2018 [retrieved from https://numato.com/kb/simple-hdmi-vga-framebuffer-design-example-on-neso-artix-7-fpga-board/ on Feb. 9, 2024] in 13 pages.

Taesiri et al., "Large Language Models are Pretty Good Zero-Shot Video Game Bug Detectors," arXiv, Oct. 5, 2022 [retrieved from https://ar5iv.labs.arxiv.org/html/2307.07221 on Feb. 9, 2024] in 9 pages.

Wang et al., "Software Testing with Large Language Model: Survey, Landscape, and Vision," arXiv, Aug. 5, 2023 [retrieved from https://ar5iv.labs.arxiv.org/html/2307.07221 on Feb. 9, 2024] in 40 pages.

Yang et al., "Dynamic Prompting: A Unified Framework for Prompt Tuning," arXiv, Apr. 5, 2023 [retrieved from https://ar5iv.labs.arxiv.org/html/2303.02909 on Feb. 9, 2024] in 21 pages.

Zhou et al., "MPEG Video Decoding with the UltraSPARC Visual Instruction Set," IEEE, pp. 470-475, 1995.

Office Action received in Chinese Patent Application No. 201910365262.0 dated Dec. 9, 2022 in 23 pages.

Office Action received in Korean Patent Application No. 10-2019-0050794 dated Oct. 19, 2020 in 21 pages.

* cited by examiner

CODING ERROR DETECTION PROCESS

MACHINE LEARNING FINE-TUNING PROCESS

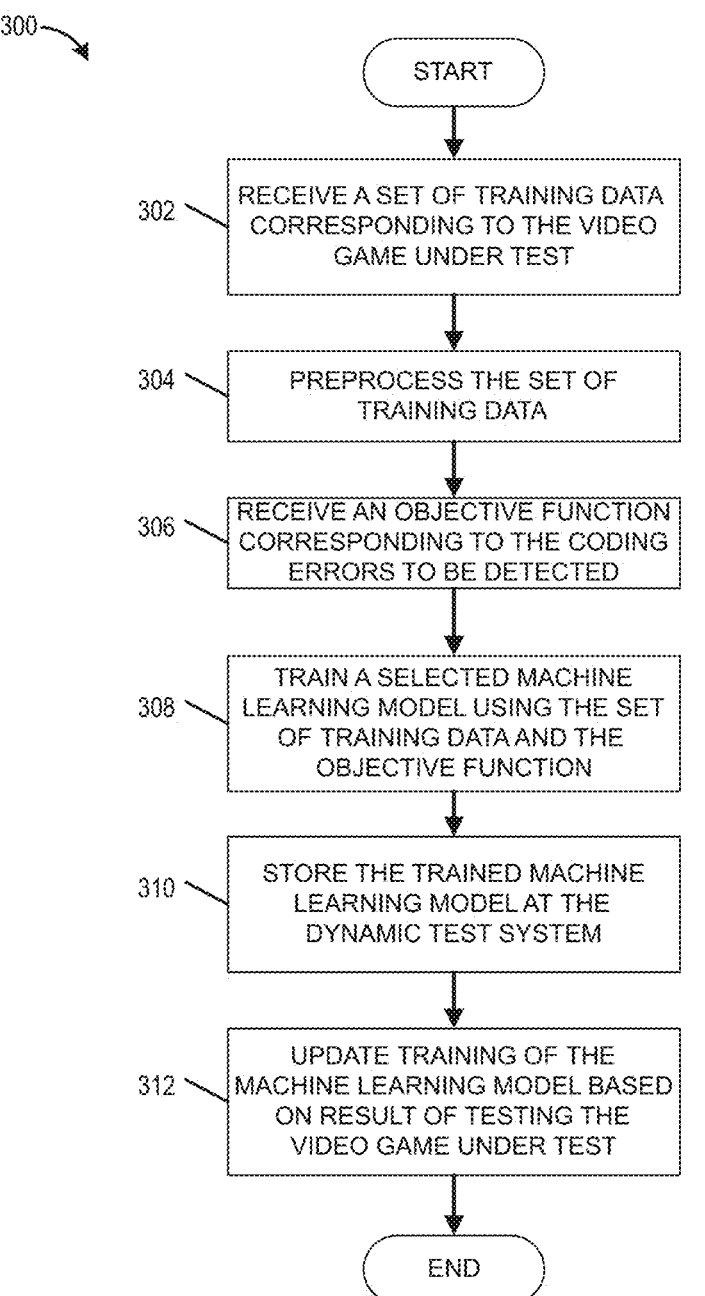

300

START

302 — RECEIVE A SET OF TRAINING DATA CORRESPONDING TO THE VIDEO GAME UNDER TEST

304 — PREPROCESS THE SET OF TRAINING DATA

306 — RECEIVE AN OBJECTIVE FUNCTION CORRESPONDING TO THE CODING ERRORS TO BE DETECTED

308 — TRAIN A SELECTED MACHINE LEARNING MODEL USING THE SET OF TRAINING DATA AND THE OBJECTIVE FUNCTION

310 — STORE THE TRAINED MACHINE LEARNING MODEL AT THE DYNAMIC TEST SYSTEM

312 — UPDATE TRAINING OF THE MACHINE LEARNING MODEL BASED ON RESULT OF TESTING THE VIDEO GAME UNDER TEST

END

FIG. 3

SYSTEM FOR IDENTIFYING VISUAL ANOMALIES AND CODING ERRORS WITHIN A VIDEO GAME

RELATED APPLICATIONS

Any and all applications for which a foreign or domestic priority claim is identified in the Application Data Sheet as filed with the present application are hereby incorporated by reference under 37 CFR 1.57.

BACKGROUND

Many video games are complex software applications that utilize a significant percentage of a computer system's resources. Each year the complexity of many of the latest video games pushes the boundaries of the latest computing systems. Modern video games comprise millions of lines of code. Testing the code of such large applications can be a time consuming and challenging process. Further, because video games are often programmed by teams of developers, changes made by one developer or team of developers working on one portion of the video game may impact code developed by another developer or team of developers working on another portion of the video game. Ensuring that a video game operates as desired can be particularly challenging when the video game is composed of different modules, which may be created independently and that are configured to operate together to create a single video game or application. Thus, code must often be tested and retested repeatedly as changes are made to the code by different teams.

SUMMARY OF EMBODIMENTS

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a visual anomaly detection system configured to detect a coding error in a video game under test, the visual anomaly detection system including: a dynamic test system configured to process one or more frames of the video game under test using a machine learning model to detect the coding error in the video game under test; and a video game test system configured to receive video output signals from a user computing system that executes an instance of the video game under test, the video game test system including: a display signal input configured to receive the video output signals from the user computing system; and a controller implemented using one or more hardware processors, the controller configured to: access a first instruction that emulates a first interaction by a user with a user interface device of the user computing system executing the instance of the video game under test; provide a first control signal that corresponds to the first instruction to the user interface device causing the user interface device to emulate the first interaction by the user with the user interface device; responsive to providing the first control signal to the user interface device, receive a first set of video output signals at the display signal input from a display output port of the user computing system; convert the first set of video output signals to a first set of pixels corresponding to a first frame generated by the video game under test; and provide the first frame to the dynamic test system, wherein the dynamic test system is further configured to: receive the first frame from the video game test system; generate a first dynamic prompt for the machine learning model, the first dynamic prompt corresponding to identifying a first type of coding error within the video game under test; apply the first dynamic prompt and the first frame to the machine learning model; receive a first output from the machine learning model; determine a first resultant action based on the first output of the machine learning model; and execute the first resultant action.

In some aspects, the techniques described herein relate to a video game test system, wherein the first instruction is selected based on a prior output generated from applying a prior dynamic prompt or a prior frame to the machine learning model.

In some aspects, the techniques described herein relate to a video game test system, wherein determining the first resultant action includes: determining whether the first output of the machine learning model indicates an existence of an anomaly within the first frame, wherein the anomaly corresponds to the first type of coding error; and selecting the first resultant action based on the determination of the existence of the anomaly within the first frame.

In some aspects, the techniques described herein relate to a video game test system, wherein the first resultant action includes initiating a coding error resolution process.

In some aspects, the techniques described herein relate to a video game test system, wherein the first resultant action includes initiating testing of a second frame corresponding to a second set of pixels obtained from a second set of video output signals.

In some aspects, the techniques described herein relate to a video game test system, wherein the first resultant action includes performing additional testing on the first frame, and wherein executing the first resultant action includes: generating a second dynamic prompt for the machine learning model, the second dynamic prompt corresponding to identifying a second type of coding error within the video game under test; applying the second dynamic prompt and the first frame to the machine learning model; receiving a second output from the machine learning model; determining a second resultant action based on the second output of the machine learning model; and executing the second resultant action.

In some aspects, the techniques described herein relate to a video game test system, wherein the first resultant action includes an interaction with the video game under test, and wherein executing the first resultant action includes: selecting a second instruction that emulates a second interaction by the user with the user interface device of the user computing system executing the video game under test; and providing an identity of the second instruction to the video game test system, wherein the video game test system: provides a second control signal that corresponds to the second instruction to the user interface device causing the user interface device to emulate the second interaction by the user with the user interface device; responsive to providing the second control signal to the user interface device, receive a second set of video output signals at the display signal input from the display output port of the user computing system; convert the second set of video output signals to a second set of pixels corresponding to a second frame generated by the video game under test; and provide the second frame to the dynamic test system.

In some aspects, the techniques described herein relate to a video game test system, wherein the dynamic test system is further configured to update the machine learning model based at least in part on the first frame.

In some aspects, the techniques described herein relate to a video game test system, wherein the controller is further configured to issue a pause command to pause the instance of the video game for at least a portion of the time that the dynamic test system processes the first frame.

In some aspects, the techniques described herein relate to a video game test system configured to test an instance of a video game under test, the video game test system including: a display signal input configured to receive video output signals from a user computing system that executes the instance of the video game under test; and a controller implemented using one or more hardware processors, the controller configured to: access a first instruction that emulates a first interaction by a user with a user interface device of the user computing system executing the instance of the video game under test; provide a first control signal that corresponds to the first instruction to the user interface device causing the user interface device to emulate the first interaction by the user with the user interface device; responsive to providing the first control signal to the user interface device, receive a first set of video output signals at the display signal input from a display output port of the user computing system; convert the first set of video output signals to a first set of pixels corresponding to a first frame generated by the video game under test; and provide the first frame to a dynamic test system configured to process one or more frames of the instance of the video game under test using a machine learning model to detect coding errors in the video game under test.

In some aspects, the techniques described herein relate to a video game test system, wherein the controller is further configured to receive a first output of the dynamic test system corresponding to processing the first frame using the machine learning model.

In some aspects, the techniques described herein relate to a video game test system, wherein the controller is further configured to select a second instruction that emulates a second interaction by the user with the user interface device of the user computing system executing the video game under test based at least in part on the first output of the dynamic test system.

In some aspects, the techniques described herein relate to a video game test system, wherein the controller is further configured to pause execution of the instance of the video game at least until the first output of the dynamic test system is received.

In some aspects, the techniques described herein relate to a video game test system, wherein the controller is further configured to initiate a coding error resolution process in response to determining that the first output indicates an existence of a coding error.

In some aspects, the techniques described herein relate to a video game test system, further including a transceiver configured to transmit the first frame to the dynamic test system.

In some aspects, the techniques described herein relate to a video game test system, wherein the controller is further configured to provide a second frame to the dynamic test system, wherein the second frame occurs a threshold number of frames subsequent to the first frame, wherein the threshold number of frames is more than one, and wherein the second frame is a next frame provided to the dynamic test system after the first frame.

In some aspects, the techniques described herein relate to a computer-implemented method of detecting an error in a video game under test, the computer-implemented method including: obtaining a first instruction that emulates a first interaction by a user with a user interface device of a user computing system executing an instance of the video game under test; providing a first control signal that corresponds to the first instruction to the user interface device causing the user interface device to emulate the first interaction by the user with the user interface device; responsive to providing the first control signal to the user interface device, receiving a first set of video output signals at a display signal input port from a display output port of the user computing system; converting the first set of video output signals to a first set of pixels corresponding to a first frame generated by the video game under test; generating a first prompt for a machine learning model corresponding to identifying a first type of error within the video game under test; applying the first prompt and the first frame to the machine learning model; receiving a first output from the machine learning model; and triggering a resultant action based at least in part on the first output.

In some aspects, the techniques described herein relate to a computer-implemented method, further including determining that the first output indicates an existence of the first type of error within the video game under test, wherein triggering the resultant action includes triggering an error resolution process.

In some aspects, the techniques described herein relate to a computer-implemented method, further including determining that the first output does not indicate an existence of the first type of error within the video game under test, wherein triggering the resultant action includes triggering generation of a second prompt for the machine learning model corresponding to identifying a second type of error within the video game under test.

In some aspects, the techniques described herein relate to a computer-implemented method, further including determining that the first output does not indicate an existence of the first type of error within the video game under test, wherein triggering the resultant action includes applying the first prompt and a second frame to the machine learning model.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 3 presents a flowchart of a machine learning fine tuning process in accordance with certain embodiments.

DETAILED DESCRIPTION OF EMBODIMENTS

Introduction

Figure 1:
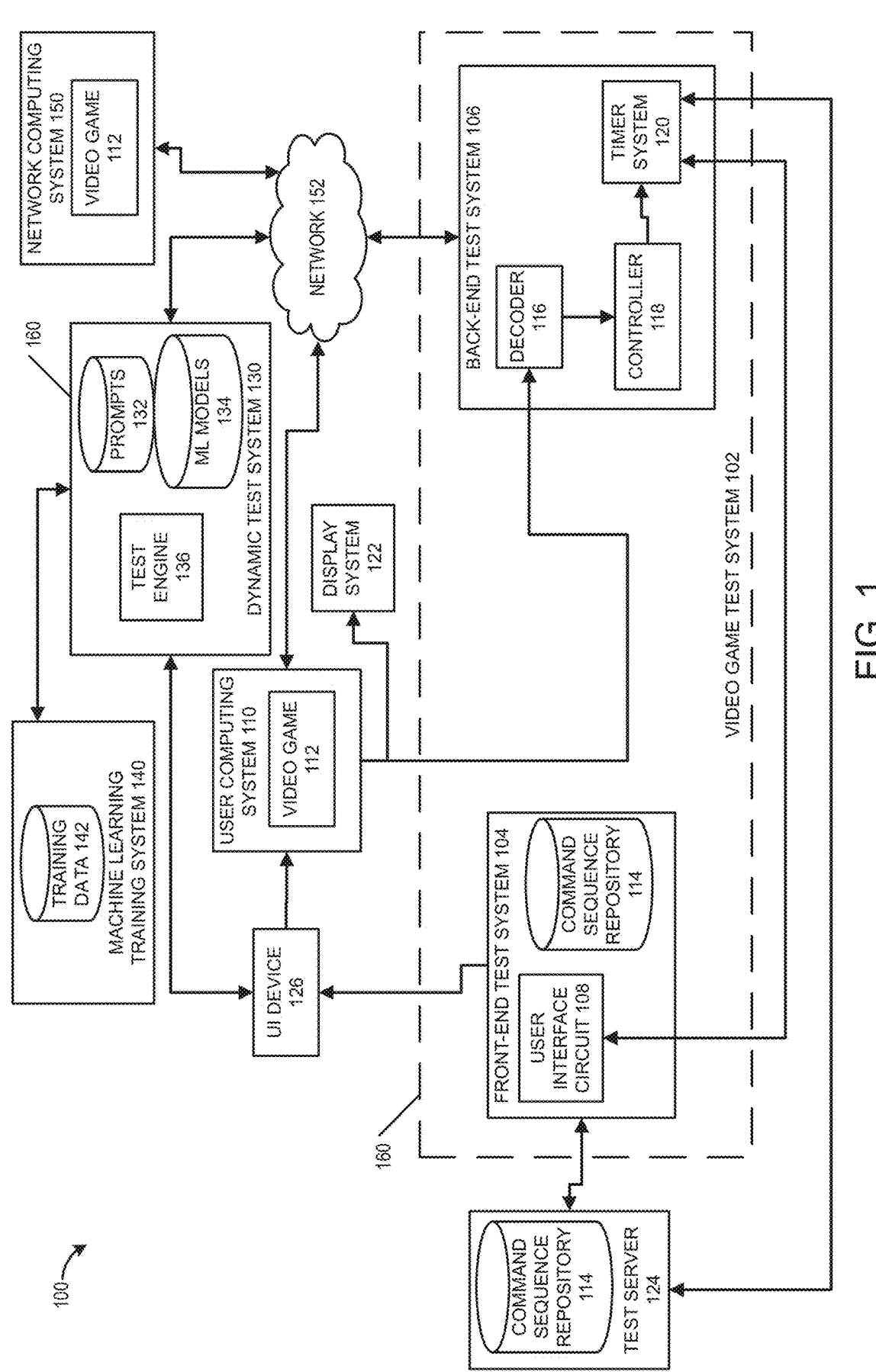
FIG. 1 illustrates a video game test environment in accordance with certain embodiments.

Testing of video games is often a manual process that can be time-consuming and require a lot of computing resources and human resources. Video games tend to be large complex pieces of software and can often be non-deterministic. For example, many video games include random or pseudo-random elements. Moreover, users that interact with video games introduce a lot of non-determinism because users can often act unpredictably. For example, when a user plays a sports-based video game, there can be thousands or even millions of different potential gameplay sequences that could occur in a match due to the large number of play options, the variety of potential non-player user actions, the skill of the users, the play style of the users, and the like. Even video games that have a relatively fixed or deterministic number of options (e.g., video games with a linear story line) can have thousands or more potential states that impact operation of the video game.

Due at least to the complexity and number of potential states of many video games, as well as the unpredictability of user interaction with the video games, the process of testing a video game can take a significant proportion of the development resources used to create a video game. In some cases, resources applied to testing the video game can be 40% or more, and with some complex video games testing my account for the majority of resources expended to create the video game.

Moreover, because certain video games are published for execution on multiple computing devices (e.g., general purpose computing systems, smart phones, and video-game specific devices, such as those created by Sony®, Microsoft®, and Nintendo®), it is often necessary to test the video game on multiple devices. This is particularly the case as the computing resources available on different devices vary.

Embodiments disclosed herein present systems and processes that automates testing of a video game under development or a video game under test. Moreover, embodiments disclosed herein perform dynamic testing that can adjust tests performed, actions, if any, performed in response to the test results, or both based on the outcome of one or more tests. The tests can be performed by applying captured video frames applied to one or more machine learning models, such as large language models, using dynamically generated prompts. Further, the captured video frames can be obtained directly from an output port of a user computing system enabling the video frames to be applied to the machine learning model without modification and with minimal to no user intervention. Additionally, the systems disclosed herein can control the user computing system hosting the video game under test enabling the test system to react to test results in real-time or near real-time (e.g., within milliseconds, while the video game is executing, before a next action is performed with respect to the video game, and the like) and to modify the testing process as tests are being performed.

Advantageously, the systems herein can reduce the amount of computing resources used to test a video game. Further, the systems herein can increase the amount of testing and the flexibility of tests being performed, which can increase testing accuracy and reducing computing system resource usage.

To simplify discussion, the present disclosure is primarily described with respect to a video game. However, the present disclosure is not limited as such and may be applied to other types of applications. For example, embodiments disclosed herein may be applied to educational applications or other applications where it may be desirable to perform dynamic testing of applications using machine learning. Further, the present disclosure is not limited with respect to the type of video game. The use of the term "video game" herein includes all types of games, including, but not limited to web-based games, console games, personal computer (PC) games, computer games, games for mobile devices (for example, smartphones, portable consoles, gaming machines, or wearable devices, such as virtual reality glasses, augmented reality glasses, or smart watches), or virtual reality games, as well as other types of games.

Example Video Game Test Environment

FIG. 1 illustrates a video game test environment 100 in accordance with certain embodiments. The video game test environment 100 can include an environment for testing a video game, such as the video game 112, or a system, such as the user computing system 110, that hosts the video game 112. For example, the video game test environment 100 may be configured to test a video game 112 under development to determine an existence of a coding error, sometimes referred to as a "bug," or any type of unexpected or unintended operation of the video game 112.

The coding error may include any type of error that causes the video game 112 to behave or operate in an undesirable or unintended manner. Often, coding errors are mistakes made in programming the video game 112. However, as used herein, in some cases, coding errors may include design errors. Design errors may include errors attributable to the design of the video game 112 rather than the programmed implementation of the video game 112. During testing, it may be determined that the design was flawed and that although the video game 112 operates as intended, the flaws may prevent the video game 112 from being playable to completion and/or from being enjoyable. For example, if a dungeon is programmed without an exit, this may be a coding error. But if the design of the dungeon omitted an exit, the lack of exit from the dungeon in the video game may be a design error rather than an error in the programming.

The video game test environment 100 may include a video game test system 102 that may perform the testing of the video game 112, in whole or in part. Advantageously, the video game test system 102 may also test the ability of the user computing system 110 to execute the video game 112. In some cases, a development version of the user computing system 110 may differ from a version of the user computing system 110 that is available to users or the general public. Often, the development version of the user computing system 110 will include tools that facilitate testing of the video game 112. For example, the development version of the user computing system 110 may include tools that enable the capture or logging of state information at a given point in time. Additionally, the development version of the user computing system 110 may also include additional computing resources that impact execution of the video game 112. For example, certain video game console manufacturers produce development versions of the video game console that have greater capabilities (e.g., more memory) than versions of the video game console sold to the general public. Accordingly, in some cases, a video game that performs as intended on the development video game console may not perform as intended on the version of the console available to the general public due, for example, to the difference in memory or other computer resources. As such, it is desirable that tests of the video game 112 are performed on versions of the user computing system 110 available to the general public. However, as indicated above, the versions of the user computing system 110 available to the general public may not include the tools (e.g., debug tools) that facilitate testing of the video game 112. Advantageously, the video game test system 102 enables testing of the video game 112 when hosted on a version of the user computing system 110 available to the general public that omits debug tools or has reduced computing resources and does not require use of a development version of the user computing system 110.

As illustrated in FIG. 1, the video game test system 102 may be divided into multiple sub-systems. For example, the video game test system 102 may be divided into a front-end test system 104 and a back-end test system 106. The front-end test system 104 and the back-end test system 106 may be implemented as separate systems that are housed separately. Alternatively, the front-end test system 104 and the back-end test system 106 may be a single system that is enclosed in a single housing. In such cases, the division between front-end and back-end may be conceptual or non-existent. Thus, regardless of whether the video game test system 102 is implemented as a single system or as separate systems, the two subsystems can, in some cases, be conceptually thought of as one system or as multiple distinct systems.

Moreover, as is described in more detail below, the video game test system 102 may be implemented using multiple different hardware processors. At least some of the hardware processors may be of different types. Further, at least some of the hardware processors may be implemented using different application-specific hardware that is configured to perform particular functions associated with the processes described herein. In other embodiments, the functionality of the video game test system 102 may be implemented by a single hardware processor configured to perform the particular processes described herein. In certain embodiments, the single hardware processor may be a general purpose processor that can execute one or more instructions to perform the processes described herein.

The front-end test system 104 may include a user interface circuit 108 and a command sequence repository 114. The user interface circuit 108 may serve as a substitute for, or may simulate, a user interface device of the user computing system 110. For example, if the user computing system 110 is a console, such as a PlayStation® or an Xbox®, the user interface circuit 108 may simulate a controller for the console. Alternatively, the user interface circuit 108 may simulate a keyboard, a mouse, a touchscreen input device, or any other input device that may be used to interact with a video game hosted by the user computing system 110. The user interface circuit 108 may obtain a command that corresponds to a user interacting with a user interface device, and provide the command to the user computing system 110. This command may be formatted the same or similar to what a user interface device (for example, an Xbox® controller) communicates to a user computing system 110. In some embodiments, the command may be a status of buttons or interface elements of the user interface device instead of or in addition to a command. For example, the user interface circuit 108 may communicate a data structure that includes a status of one or more user interface elements of the user interface device that is being simulated by the user computing system 110.

In some cases, the user interface circuit 108 may serve as a substitute for a human user. For example, the user interface circuit 108 may provide control signals to a user interface device 126. The user interface device 126 may be a user interface device of the user computing system 110, such as a gamepad, a keyboard, a touchscreen, and the like. In some such cases, the user interface circuit 108 may provide a signal to the user interface device 126 that mimics a user input or that causes the user interface device 126 to output a signal that corresponds to a signal the user interface device 126 outputs when human user performs a corresponding interaction with the user interface device 126. Thus, in some cases, the user interface circuit 108 may serve as the UI device for the user computing system 110 and in other cases, the user interface device 126 may serve as the UI device for the user computing system 110 and the user interface device 126 may be controlled by the user interface circuit 108 of the video game test system 102.

In certain embodiments, the user interface circuit 108 may obtain a sequence of commands and may provide the sequence of commands to the user computing system 110. The sequence of commands may be provided in series simulating a user's performance of a series of interactions with a user interface device. Alternatively, the sequence of commands may be provided in parallel simulating a user's ability to perform a combination of interactions with a user interface device, such as the pressing of a direction button or an analog stick while simultaneously pressing an action button on a gamepad or controller. In yet other embodiments, at least some of the sequence of commands may be provide in parallel while other commands are provided serially. The commands that the user interface circuit 108 provides to the user computing system 110 may be the same commands that a user interface device 126 would provide to the user computing system 110 if a user were interacting with the user interface device 126 to perform the same interactions.

The commands or command sequence may be provided to the front-end test system 104 by the test server 124. A user, such as a designer or tester of the video game 112 may generate a sequence of commands to test the video game 112 using the test server 124. The test server 124 may then provide the sequence of commands to the front-end test system 104, which may store the commands at the command sequence repository 114. The command sequence repository 114 may store multiple sequences of commands. Each of the sequences of commands may be associated with a separate label or identifier. A particular sequence of commands may be selected by the front-end test system 104 or the user interface circuit 108 based on the selection or identification of a particular desired test.

During execution of a test, the user interface circuit 108 may obtain the command or sequence of commands used during the test from the command sequence repository 114. Advantageously, in certain embodiments, by obtaining the commands from the command sequence repository 114 that is included as part of the front-end test system 104, latency that may occur by communicating with the test server 124 may be eliminated. Further, the front-end test system 104 can be pre-loaded with test command sequences, eliminating the need for the test server 124 to be present during performance of the test. Accordingly, the video game test system 102 may have increased portability compared to a system that receives commands from the test server 124 during performance of the testing process.

Moreover, storing command sequences at the command sequence repository 114 enables a particular test of the video game 112 to be repeated multiple times, or on multiple iterations or versions of the video game 112. For example, each time a change is made to the video game 112 during a development process, or when an update or expansion is developed for the video game 112, tests can be repeated using stored test sequences stored at the command sequence repository 114. Further, by storing commands at the command sequence repository 114, tests can be performed using an automated process with reduced or no user involvement compared to systems that may require a user to interact with the video game 112 to test the video game 112.

The back-end test system 106 may capture output from the user computing system 110. This output may be one or more signals that are output from the user computing system to a display system 122 (e.g., a monitor or television). In certain embodiments, the back-end test system 106 may replace the display system 122. In other embodiments, a splitter, or other electronic device (not shown), may be used to provide a copy of the output signals provided to the display system 122 to the back-end test system 106. By splitting the signal, a user can observe output on the display system 122 while the back-end test system 106 performs one or more tests on the output of the user computing system 110 that may be used to evaluate operation of the video game 112. Advantageously, unlike certain other test systems, it is unnecessary for the output of the video game 112 to be displayed on a display system 122 to perform a test of the video game 112 even when the test of the video game 112 relates to testing graphical output or latency.

The back-end test system 106 may include a decoder 116, a controller 118, and a timer system 120. The decoder 116 of the back-end test system 106 may include an input port that connects to an output port of the user computing system 110. The input and output ports may be any type of port that can provide video, audio, or video and audio signals. For example, the output port of the user computing system 110 may be a DisplayPort, a Digital Visual Interface (DVI) port, or a High-Definition Multimedia Interface (HDMI) port. Generally, the decoder 116 connects via a wired connection to an output port of the user computing system 110. By connecting via a wired connection, latency and/or noise associated with a wireless connection may be avoided. However, in certain embodiments, the decoder 116 may connect to the user computing system 110 using a wireless connection.

The decoder 116 may include any circuit or system that can obtain signals from the user computing system 110, via an output port of the user computing system 110, and that can convert the signals to pixels. For example, the decoder 116 may be configured to convert HDMI signals to a set of pixels representing a frame of an animation generated by the video game 112. This frame may be part of an animation that the developer of the video game 112 intends to be displayed on a display, such as the display provided by the display system 122. Although much of the present disclosure is directed to determining a result of testing the video game 112 based on animation produced by the video game 112, it should be understood that test results can be determined based on audio produced instead of or in addition to animation. In such cases, the decoder 116 may convert signals received from an output port of the user computing system 110 into audio. Moreover, in some cases, an audio-to-text system (not shown, but which may be included in the decoder 116 or the controller 118) may be used to convert at least some of the audio into text.

The decoder 116 may provide the pixels to the controller 118. In certain embodiments, the decoder 116 provides the pixels a frame at a time to the controller 118. In other embodiments, the decoder 116 provides the pixels to the controller 118 as the controller 118 converts the output signals to pixels. Thus, in some cases, the controller 118 may receive portions of a frame while the decoder 116 continues to convert received signals to additional pixels included in the frame. In some cases, the pixels may be provided in a raster order or raster scan order.

The controller 118 may include any system or circuit that can process pixels received from the decoder 116. The controller 118 may determine whether to provide the pixels to a dynamic test system 130 for further processing. Further, the controller 118 may control operation of the front-end test system 104. For example, the controller 118 may issue a command to the front-end test system 104 to cause the front-end test system 104 to pause execution of the video game 112 at the user computing system 110. Pausing the video game 112 may be desirable to enable processing of one or more tests of the video game 112 to complete before further execution of the video game 112 occurs. As another example, the controller 118 may control whether and/or which action command or commands emulating user interaction with the video game 112 is performed next or at a particular time.

In some embodiments, the controller 118 may identify a subset of pixels, which may store embedded data. In some cases, the entire set of pixels representing a frame may be used with embodiments disclosed herein. In other embodiments, a subset of pixels is used because, for example, a particular test may be concerned with only embedded data rather than the entire output frame of an animation generated by the video game 112.

The timer system 120 may include any system or circuit that can determine a passage of time beginning with the issuance of a command by the user interface circuit 108 to the user computing system 110. Thus, the timer system 120 can determine a length of time from when a simulated user interaction with the video game 112 occurs until a particular event within the video game 112 occurs. This particular event can be a change in state of the video game 112 and/or the output of an animation frame by the video game 112. In some embodiments, the timer system 120 may determine the occurrence of the event based at least in part on whether a subset of pixels includes embedded data and/or whether the embedded data includes particular information. Alternatively, or in addition, the timer system 120 may count a number of frames that are output by the video game 112 to determine a length of time or whether to trigger an action, such as pausing of the video game 112 or causing a command to be issued to the video game 112 via the user interface circuit 108.

The timer system 120 may initiate one or more timers in response to a trigger received from the front-end test system 104. The front-end test system 104 may trigger a timer when providing a command from the command sequence repository 114 to the user computing system 110. When the timer system 120 identifies an occurrence of a frame, a particular tag or piece of data embedded in pixels of the frame, a particular number of frames being output, or any other trigger associated with an output of the user computing system 110, the timer system 120 may stop the timer. The timer system 120 may provide an indication of the trigger and/or a measure of the elapsed time to the test server 124, which may present the measure of the elapsed time to a user. This measure of elapsed time may correspond to a latency between when a command is provided to the user computing system 110 by the user interface circuit and when a corresponding event occurs at the video game 112. In some embodiments, the timer may be a counter that counts the occurrence of a number of events that have occurred within the video game 112 since the counter has been initiated until an event corresponding to the command has occurred. Alternatively, or in addition, the counter may measure a number of frames output by the user computing system 110 until the corresponding event occurs at the video game 112. Thus, in some embodiments, the command latency may be a measure of time, a measure of events occurred, a measure of frames output, or any other metric that may be measured with respect to the execution of a video game under test and/or a command provided to the user computing system 110 hosting the video game 112 under test. Additional embodiments that may be implemented by the video game test system 102 to determine latency are described in U.S. Pat. Nos. 11,020,658 and 10,963,365, which are hereby incorporated by reference in their entirety for all purposes and made part of the present disclosure.

As indicated above, the decoder 116, or other elements of the back-end test system 106 or video game test system 102, may provide the pixels representing a frame of an animation output by the video game 112 to the dynamic test system 130. The dynamic test system 130 may include a test engine 136. The test engine 136 may be implemented in software or as one or more hardware processors. The test engine 136 may execute one or more machine learning models. Alternatively, the test engine 136 may supply an input to a machine learning model hosted at a data center (not shown) or other cloud services center (not shown).

The dynamic test system 130 may supply the frame or pixels of the frame to a machine learning model executed by the test engine 136. This machine learning model may generate an output associated with testing the pixels or frame to determine whether one or more conditions are satisfied. The conditions may be associated with any type of characteristic or feature that can be evaluated from a frame of an animation of the video game 112. For example, the machine learning model may evaluate whether there is an error associated with textures of models or objects within the animation. As another example, the machine learning model may evaluate whether there is a collision error. In yet another example, the machine learning model may evaluate whether there is an error relating to the rules of physics used by the video game 112. For instance, if the animation depicts a collision with a balloon causing an airplane to crash, it may be determined that there may be an error associated with the definition of the balloon, the definition of the airplane, or the rules of physics applied in the video game 112.

The machine learning model may include any type of machine learning model that can determine the likelihood of an error, or lack of error, in the video game 112 based on a frame or pixels of a frame (or set of frames) of animation output by the video game 112. In some cases, the machine learning model may determine the likelihood of an error, or lack of error, based on audio or a combination of audio and animation output by the video game 112. The machine learning model may be a neural network or a large language model, such as Generative Pre-trained Transformer 3.5/4 (GPT 3.5/4), Open Pre-trained Transformer (OPT), or InstructGPT.

The dynamic test system 130 may include a prompts repository 132 and a machine learning models repository 134. The prompts repository 132 may include a set of one or more prompts that may be applied to the machine learning model. In some cases, the test engine 136 may dynamically select a prompt to supply to the machine learning model based at least in part on an output of the machine learning model generated in response to a previously supplied prompt and/or a previously supplied frame of the animation. In other cases, a set of prompts may be applied sequentially for each frame supplied to the dynamic test system 130.

The prompts may be associated with the test to be performed on the video game 112 and can include any type of prompt that can facilitate testing the video game 112. For example, the prompts may request that the machine learning model identify one or more of the following: screen tears, missing textures, inconsistent textures, inconsistent physics implementations, collision errors, illustrated events, the omission of illustrated events, or any other query for which the answer can be predicted or ascertained based on one or move animation frames of the video game 112. The test engine 136 may apply each prompt along with the frame received from the back-end test system 106 to a machine learning model to test the video game 112.

The machine learning models repository 134 may store one or more machine learning models. In cases where the machine learning models repository 134 stores multiple machine learning models, the test engine 136 may select a machine learning model based on the prompt, the video game 112, or the genre of the video game 112. In accordance with certain embodiments, multiple machine learning models may be trained or fine tuned because, for example, unique aspects of certain video games or video game genres may result in inconsistent outputs for the same prompt. For example, for a sports game or a computer role-playing game (CRPG), animation that depicts disembodied arms may be associated with a coding error and may be identified as such by the machine learning model. However, for many first-person shooting games, depicting disembodied arms may be intentional as many such games depict only a player's arms and weapons. Accordingly, in some embodiments, different machine learning models may be trained or fine-tuned to evaluate or test different video games or video game genres.

The combination of the video game test system 102 and the dynamic test system 130 may form a visual anomaly detection system 160 that can be used to detect a coding error in the video game 112. As indicated by the application of the same reference number ("160") to both the video game test system 102 and the dynamic test system 130, the video game test system 102 and the dynamic test system 130 may be two elements of the same system, the visual anomaly detection system 160.

The video game test system 102 may capture frames of animation generated by the video game 112 being executed by the user computing system 110. These frames of animation may be intercepted, captured, or otherwise redirected from the user computing system 110 to the video game test system 102 by obtaining the corresponding video output signals from the port configured to output the corresponding video output signals to the display system 122. The video game test system 102 may provide the frames of animation to the dynamic test system 130, which can apply them to a machine learning model to detect coding errors based at least in part on a determination of a visual anomaly in the animation frames (e.g., screen tearing, missing textures, unexpected images, etc.).

The video game test environment 100 may further include a machine learning training system 140. The machine learning training system 140 may train or fine-tune a machine learning model. Once trained or fine-tuned, the machine learning model may be used by the test engine 136 to test animation frames of the video game 112.

The machine learning training system 140 may include a training data repository 142. The training data repository 142 may include training data for training or fine-tuning the machine learning models. This training data may be specific to the video game 112, specific to a genre or type of video games that includes the video game 112, or associated with video games generally. The training data may include any type of data that may facilitate training or fine-tuning a machine learning model to identify coding errors based on frames of an animation. For example, the training data may include images of objects with textures, with missing textures, with normal orientations, with abnormal orientations, in poses that match the video game physics, in poses that defy the video game physics, and the like. As another example, the training data may include images of screen tearing, images of improper collision handling, images without errors, and the like.

The video game 112 may be designed to be hosted exclusively on a user device. Alternatively, the video game 112 may be hosted at least in part on a network computing system 150. For example, the video game 112 may include a client portion hosted by computing systems of player users and a server portion that maintains a persistent in-game world. Often, in such cases where the video game is distributed between a client and a server, the animation is generated or output by the client portion hosted by the user computing system 110. Accordingly, embodiments of the present disclose can test one or both of a client portion and a server portion of the video game 112 based on animation frames output by the user computing system 110.

In some embodiments, the video game test system 102 may communicate with the dynamic test system 130 via a network 152. In some such cases, the video game test system 102 may include a transceiver that enables the video game test system 102 to communicate in a wired or wireless manner with the network 152 and/or the dynamic test system 130. Similarly, in cases where the video game 112 is distributed between a client and a server, the user computing system 110 may communicate with the network computing system 150 via the network 152. Further, although not illustrated, the dynamic test system 130 may communicate with the user computing system 110 via the network 152. In other cases, the dynamic test system 130 may communicate directly with the user interface device 126, which may be separate as illustrated or part of the user computing system 110.

The network 152 may include any type of wired or wireless network, or a combination of wired and wireless networks. For example, the network 152 may be a local area network, a wide area network, a Wi-Fi® network, a cellular network, an ad hoc network, a satellite network, a wired network, a wireless network, or any other type of network. In some cases, the network 152 may include the Internet.

The user interface circuit 108 may be implemented as an application specific integrated circuit (ASIC), a field programmable gate array (FPGA), a microcontroller (for example, a Cortex® M4 from ARM® as used in a prototype of the front-end test system 104), or any other type of special purpose computing system or integrated circuit. Further, the user interface circuit 108 may interface with a port of the user computing system 110. This port may be a proprietary port or a standardized port, such as a Universal Serial Bus (USB) port. The use of a special purpose circuit enables the front-end test system 104 to be miniaturized. For example, the front-end test system 104 may be as small as or smaller than a user interface device being simulated by the front-end test system 104. Alternatively, in certain embodiments, the user interface circuit 108 may be a general purpose computer. Further, the command sequence repository 114 may be implemented in any type of a volatile or non-volatile memory, such as a ROM, RAM, SRAM, flash memory, or a magnetic hard disk drive. In certain embodiments, the command sequence repository may be implemented in memory of the user interface circuit 108. Thus, in certain embodiments, the user interface circuit 108 and the command sequence repository 114 may be combined.

The decoder 116 may be implemented using an ASIC, FPGA, microcontroller, or any other type of special purpose computing system or integrated circuit. For example, the decoder 116 may be a digital signal processor specifically designed to convert HDMI signals to pixels. In a prototype implementation of the back-end test system 106, a custom built HDMI decoder board that includes an ADV 7611 ASIC from Analog Devices® was used to implemented the decoder 116. However, the decoder 116 is not limited as such, and any special purpose system or integrated circuit may be used to decode the output of the user computing system 110 into pixels.

The controller 118 may be implemented using an ASIC, FPGA, microcontroller, or any other type of special purpose computing system or integrated circuit. Further, the controller 118 may receive pixels from the decoder 116 as the output signals of the user computing system 110 are converted or decoded. In other words, in certain embodiments, the pixels may be streamed in a particular order (for example, top left to bottom right for an image) to the controller 118. By streaming the pixels to the controller 118 as they are generated, the controller 118 can more easily identify a subset of pixels to provide to the timer system 120.

The timer system 120 may be implemented using an ASIC, FPGA, microcontroller, or any other type of special purpose computing system or integrated circuit. Further, the timer system 120 may receive a subset of pixels from the controller 118. The timer system 120 may extract data from the subset of pixels to determine whether a stop condition or other data has been embedded into the subset of pixels. In some cases, extracting the data from the subset of pixels may include comparing pixel values to a library of pixel values stored at the timer system 120 that are associated with particular data or conditions. For example, the timer system 120 may compare the pixels values of the subset of pixels to a value or set of values indicating that an event has occurred in the video game 112. This value or set of values may be stored in a memory of the timer system 120.

The front-end test system 104 may interface between, or otherwise communicate with, a user computing system 110, a test server 124, and the back-end test system 106. The front-end test system 104 may communicate with the test server 124 via a direct connection or over a network 152. Typically, the front-end test system 104 will communicate via a direct connection, such as a physical wire, with the user computing system 110 and the back-end test system 106. It is desirable to have a direct connection between each of the front-end test system 104, the back-end test system 106, and the user computing system 110 to reduce or eliminate communication latency. This communication latency can add errors in the measurement of latency between interaction with a user input device and an occurrence of a corresponding event in the video game 112. Although it is generally desirable for the connections between each of the front-end test system 104, the back-end test system 106, and the user computing system 110 to be direct or wired connections, it is possible, and sometimes even desirable, for at least one of the connections to be wireless connections. For example, it may be desirable to test the amount of latency introduced by use of a wireless controller to determine whether the video game 112 has a desired responsiveness when using a wireless controller. In some such cases, the front-end test system 104 may be configured to communicate wirelessly with the user computing system 110 to obtain test measurements of latency between interaction with a user input device and the occurrence of a corresponding event in the video game 112.

As previously stated, the user computing system 110 may include or host a video game 112. In some cases, the video game 112 may execute entirely on the user computing system 110. In other cases, the video game 112 may execute at least partially on the user computing system 110 and at least partially on another computing system, such as the network computing system 150. In some cases, the video game 112 may execute entirely on the network computing system 150, but a user may interact with the video game 112 via the user computing system 110. For example, the game may be a massively multiplayer online role-playing game (MMORPG) that includes a client portion executed by the user computing system 110 and a server portion executed by one or more application host systems that may be included as part of a network-based interactive computing system. As another example, the video game 112 may be an adventure game played on the user computing system 110 without interacting with another system.

The user computing system 110 may include hardware and software components for establishing communications over a communication network (not shown). For example, the user computing system 110 may be equipped with networking equipment and network software applications (for example, a web browser) that facilitate communications via a network (for example, the Internet) or an intranet. The user computing system 110 may have varied local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms or consoles (such as a PlayStation®, an Xbox®, or a Nintendo Switch™), television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIGS. 5 and 6.

The display system 122 can include any system for displaying output of the user computing system 110. In some embodiments, the display system 122 may be part of the user computing system 110. For example, if the user computing system 110 is a portable game system, the display system 122 may be built into the user computing system 110. In other embodiments, the display system 122 may be separate from the user computing system 110. For example, if the user computing system 110 is a game console, the display system 122 may be a television that may be manufactured or sold by a different entity than the user computing system 110.

The test server 124 may include any type of computing system that can interface with the video game test system 102 to provide a series of instructions or commands to the video game test system 102 to perform during a testing process, such as the process 200. For example, the test server 124 may be a server computing system, a desktop, a laptop, a network-based or cloud computing system, or any other computing system that a tester may use to facilitate testing a video game 112 or a user computing system 110 hosting the video game 112 using the video game test system 102.

The dynamic test system 130 may include any type of computing system that can host or interact with a machine learning model. Further, the dynamic test system 130 can include any type of computing system that can select or generate machine learning prompts (e.g., LLM prompts) and that can apply the prompts along with data to be analyzed based on the prompts to the machine learning model. In some cases, the data to be analyzed (e.g., a frame of an animation) is included with the generated prompt, which may then be supplied collectively to the machine learning model.

In some embodiments, the dynamic test system 130 is a separate system from the video game test system 102. In other embodiments, the dynamic test system 130 is part of the video game test system 102.

The machine learning training system 140 may include any type of computing system that can train or fine-tune a machine learning model, such as a large language model. In some cases, the machine learning training system 140 may be part of a collection of computing systems that collectively train the machine learning model, such as a set of LLM training servers implemented at a data center.

Example Coding Error Detection Process

Figure 2:
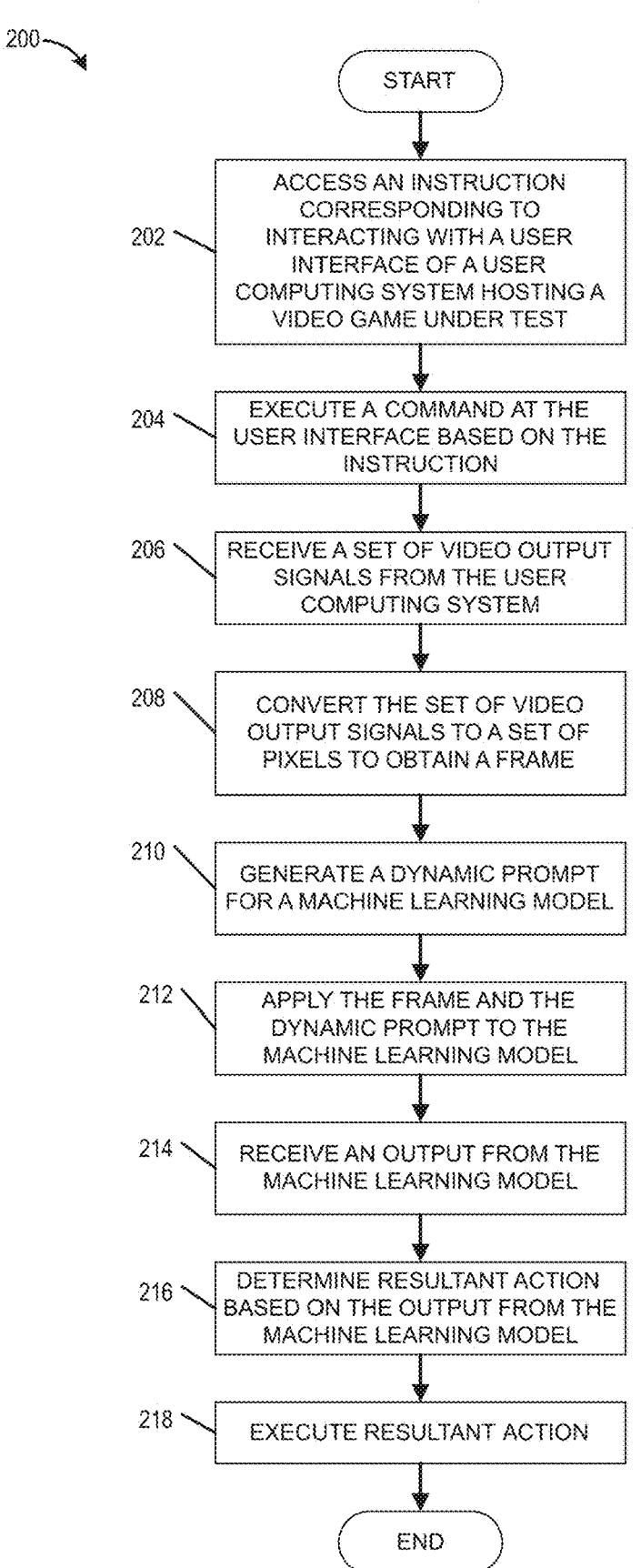
FIG. 2 presents a flowchart of a coding error detection process in accordance with certain embodiments.

FIG. 2 presents a flowchart of a coding error detection process 200 in accordance with certain embodiments. The process 200 can be implemented by any system that can determine or predict an existence of a coding error or bug within the video game 112 based on a frame of an animation applied to a machine learning model. The process 200, in whole or in part, can be implemented by, for example, a visual anomaly detection system 160, a video game test system 102, a front-end test system 104, a back-end test system 106, a user interface circuit 108, a decoder 116, a controller 118, a timer system 120, a dynamic test system 130, or a test engine 136, among others. Although any number of systems, in whole or in part, can implement the process 200, to simplify discussion, the process 200 will be described with respect to particular systems.

The process 200 may be performed continuously, such as in response to each instruction or command provided to the video game 112 via a user interface device 126 and/or for each frame of animation generated by the video game 112. Alternatively, the process 200 may be performed in response to particular commands or instructions as may be identified as part of a testing process. For example, it may be desirable to test particular features or events within the video game 112. However, there may be actions that are to be performed in order to trigger an event or to access a feature. In such cases, preliminary commands that set the stage for the test may not be evaluated as part of the process 200 and the process 200 may begin in response to the video game 112 reaching a particular state or in response to a particular event. Further, the process 200 may be performed for each generated animation frame, or for particular generated animation frames. For example, certain video games are designed to generate 30 or 60 or some other number of frames per second. It can be resource intensive and, in some cases, provide minimal benefit to test each of the generated frames. Accordingly, in some cases, the process 200 may be performed on a subset of frames (e.g., 1 frame per second, 1 out of every 15 frames, 1 out of every 30 frames, and the like).

The process 200 begins at block 202 where the front-end test system 104 accesses an instruction corresponding to interacting with a user interface (e.g., via a user interface device 126) of a user computing system 110 hosting a video game 112 under test. The instruction may be associated with emulating an interaction by a user with a user interface device 126 of the video game 112 under test. The instructions may be accessed from a command sequence repository 114 at the front-end test system 104 or at the test server 124. Alternatively, or in addition, a user (e.g., a tester) may provide an instruction via a user interface generated by the user interface circuit 108. In some cases, accessing the instruction may include receiving an identify of an instruction from the test server 124 and/or a user.

In some embodiments, the instructions may be received as part of a script, from a database (e.g., the command sequence repository 114), or from an output of a machine learning model. In some cases, an instruction may be received or determined based on a result of the performance of the process 200. In other words, in some cases, the result of a prior performance of the process 200 may be used to determine by, for example, the dynamic test system 130 an instruction for a subsequent performance of the process 200 by the dynamic test system 130.

The instructions may include a single instruction, a sequence of instructions, or multiple sequences of instructions. In some cases, each sequence of instructions may be associated with a separate test, a test of a different part of the video game 112, or a test of the video game 112 under different conditions or states. The received instructions may correspond to interactions with a user interface device 126 that a user may perform when playing the video game 112. For example, the instructions may represent the commands provided to a user computing system 110 hosting the video game 112 when a user interacts with the user interface device. For instance, when a user presses the "up" button on a game controller, the game controller may provide a particular command to the user computing system 110 informing the user computing system 110 that the user pressed the "up" button. The instructions received from the front-end test system 104 may include the same particular command. Thus, the received instructions may simulate a user interacting with the game controller.

The user interface device 126 may include any device that a user can use to play or interact with the video game 112. For example, the user interface device 126 may be a gamepad or game controller, a keyboard, a mouse, or a touch sensitive display.

At block 204, the front-end test system 104 executes a command at the user interface based on the instruction. In some embodiments, the command and the instruction may be the same. In such cases, executing the command may include transmitting the instruction to the user computing system 110 or to the user interface device 126 to cause the user interface device 126 to perform the command with respect to the video game 112 at the user computing system 110.

Alternatively, the command may be a simulation of a user interaction with the user interface device 126 (e.g., with a button, analog stick, or other user interface element of the user interface device 126) that accomplishes the instruction. For example, if the instruction is to make the player character run, the user interface circuit 108 may provide a command to the user interface device 126 that causes the user interface device 126 to transmit a control signal to the user computing system 110 corresponding to the player run command (e.g., the control signal associated with holding down an analog stick and pressing forwards, or the control signal associated with holding down a button associated with running in the video game 112, etc.).

At block 206, the back-end test system 106 receives a set of video output signals from the user computing system 110. The video output signals can be any type of video output signal supported by the user computing system 110 and/or the display system 122. For example, the video output signals may be HDMI signals, DisplayPort signals, analog signals, digital signals, etc. As an alternative to, or in addition to, the set of video output signals, the back-end test system 106 may receive audio or haptic feedback signals.

The received set of video output signals may be output by an output port of the user computing system 110 that is connected to the display system 122. A splitter (not shown) or other redirection circuit may be connected between the user computing system 110 and the display system 122 to provide the video output signals to the back-end test system 106 instead of or in addition to the display system 122. In some cases, the display system 122 may be omitted and the user computing system 110 may be in direct communication with the back-end test system 106.

At block 208, the back-end test system 106, using for example the decoder 116, converts the set of video output signals to a set of pixels to obtain a frame. Converting the output signals to pixels may include generating an image or a frame of an animation based on the output signals. The back-end test system 106 may provide the frame to the dynamic test system 130 directly or via a network 152.

At block 210, the dynamic test system 130 generates a dynamic prompt for a machine learning model. The dynamic prompt may include any type of prompt that may be used to query a machine learning model to determine whether a coding error, or bug, a visual anomaly, or any other type of undesired occurrence with respect to the video game 112 can be detected from a frame (or set of frames) of an animation generated by the video game 112. Some non-limiting examples of prompts can include querying whether there are anomalies in the detected shaders, textures, or other graphical features of objects. Additional non-limiting examples of prompts can include querying whether there are issues with collision detection, screen tearing, frame rates, the application of physics rules, and the like. It should be understood that the specific wording of the query or prompt may vary based on the large language model to improve accuracy of the prompt. For example, a prompt may state "Evaluate the uploaded Frame and identify occurrences of improper collision detection." As another example, the prompt may state "Evaluate application of collision rules to the attached Frame."

In some embodiments, a plurality of prompts may be used to determine a coding error or a coding error of a particular type. For example, a first prompt may be used to determine whether an object is in an unnatural position. A second prompt may be used to determine interactions between the object and another object depicted in the frame. A third prompt may be used to determine whether laws of physics appear to be satisfied based on the relative depiction of the objects within the frame, which in some cases may take into account relative positions of objects in past frames. The combination of these prompts may help identify whether there are anomalies due to application of the physics engine, the collision detection, the limits of thresholds placed on an object, or the application of graphics features (e.g., textures, shaders, lighting, etc.) to an object, among other tests. Moreover, as illustrated from this example, although an image generated by the video game 112 is being evaluated, the system disclosed herein can be used to detect not only errors in the animation, but other coding errors that may be related to other parts of the video game 112 (e.g., a physics engine) that can be detected through the animation.

In some embodiments, the frame received as part of the operations of the block 208 may be integrated into the prompt. In other embodiments, the frame may be a separate input to the LLM that and the prompt may reference or otherwise be applied to the frame.

The dynamic prompt may be generated based at least in part on an output of a machine learning model that is produced responsive to a prior prompt that is directed to the frame and/or a prior frame applied to the machine learning model. For example, suppose an initial prompt is supplied to the machine learning model that queries whether the frame illustrates a visual anomaly. If the output indicates that a visual anomaly exists, a second prompt may be generated that queries whether the visual anomaly is related to the textures of an object, screen tearing, or if it may be related to collision detection.

In some cases, the dynamic prompt may be selected from a list or script that includes a set of prompts that are to be applied to each frame being evaluated of the video game 112 under test. In some cases, the list or set of prompts is one of a plurality of a set of one or more prompts. In such cases, the set of prompts may be selected based on a desired test or feature of the video game 112 to be tested. When there is a plurality of prompts to be applied to a machine learning model, the prompts may be applied in series. In some cases, an earlier prompt may be selected, generated, or modified based on a result (e.g., an output of the machine learning model) of an earlier prompt.

The prompt may be dynamic in that the prompt may be selected based on a desired test, an output of an earlier prompt, a type of video game 112, or any other factor that may affect the selection of a prompt or a testing of the video game 112. In some cases, the prompt may be dynamic in that it may be one of a plurality of prompts applied to the frame.

At block 212, the dynamic test system 130 applies the frame and the dynamic prompt to the machine learning model. As described above, applying the frame and the dynamic prompt to the machine learning model may include applying the frame and prompt as two separate inputs. Alternatively, the frame may be included as part of the prompt that is applied to the machine learning model.

Further, as previously described, the machine learning model, such as an LLM, may be hosted by the dynamic test system 130 or may be hosted elsewhere, such as at a data center. In cases where the LLM is hosted at a data center, or elsewhere, the dynamic test system 130 may transmit the prompt and the frame to the LLM host or to a front-end system at the data center that manages inputs to the LLM.

Optionally, at the block 212, the dynamic test system 130 and/or the video game test system 102 may transmit a command to the user interface device 126 to pause execution of the video game 112 or to put the video game 112 in a paused state. It may be desirable to pause the video game 112 to provide time for the dynamic test system 130 to finish analyzing the frame received at the block 208. Although processing a single prompt may be relatively fast, it may take time to process multiple prompts and determine subsequent actions. In some cases, the subsequent actions may vary based on the analysis of the frames. For example, if no error is detected, the dynamic test system 130 may output a command for the video game test system 102 to continue executing a command sequence stored in the command sequence repository 114. But if an error is detected, in some cases, the dynamic test system 130 may output a command for the video game test system 102 to perform a different sequence of commands with respect to the video game 112. In other cases, the dynamic test system 130 may request additional frames for further analysis to confirm the existence of the error. For example, as stated above, the video game 112 may output animation at 30 or 60 frames per second (FPS). To reduce computational overhead, the visual anomaly detection system 160 may initially process, using the process 200, one frame of the set of frames output per second. If a suspected coding error is detected by the machine learning model, the visual anomaly detection system 160 may determine to process another frame, using the process 200, within the same set of frames forming the 30 or 60 FPS, or other framerate.

At block 214, the dynamic test system 130 receives an output from the machine learning model. The output may indicate the existence of a coding error or lack of a coding error. In some cases, the output may indicate the existence of particular images or events within the frame with or without indicating whether the images or events imply a coding error. For example, the output of the machine learning model may indicate that a texture is missing or that an object is bisected by another object (e.g., a car is partway through a solid wall). The dynamic test system 130 may determine based on the output of the machine learning model whether a coding error exists or is likely to exist within the video game 112.

At block 216, the dynamic test system 130 determines a resultant action based at least in part on the output from the machine learning model. The resultant action may include any type of action that can be performed responsive to an output of the machine learning model. Further, in some cases, the resultant action may be to take no action. Further, in some cases, a particular resultant action may be performed regardless of the output of the machine learning model. For example, after processing a first prompt at the block 212, the dynamic test system 130 may apply a second prompt from the prompts repository 132 to the machine learning model regardless of the response to the first prompt.

The resultant action may include a coding error resolution process. This coding error resolution process may include any type of action associated with responding to a detected error. For example, the coding error resolution process may include alerting a test engineer or video game tester, logging a state of the video game 112, logging the frame processed at the block 212, logging a time of occurrence of the frame, logging any other type of information that may facilitate identifying the coding error or bug within the video game 112, logging the prompt and the output associated with the prompt, or logging any other information that may be used to identify or reproduce the error, or any other action that may be performed in response to detecting a coding error or suspected coding error.

In some cases, the resultant action may include processing another prompt. This second prompt may be based on the output of the first prompt. For example, if the output of the first prompt indicates an existence of a visual anomaly, a second prompt may be selected to obtain further information about the type of visual anomaly.

In some cases, the resultant action may include processing another frame of the animation generated by the video game 112. This frame may be an immediately subsequent frame, another frame within a particular time period (e.g., within the same second), a frame within a subsequent or later time period, a frame generated in response to another user simulated interaction with the video game 112, or any other frame output by the video game 112.

In some cases, the resultant action may include selecting a particular action to perform at the video game 112. For example, if the machine learning model indicates an error in a frame that was generated in response to a playable character jumping, the dynamic test system 130 may instruct the front-end test system 104 to issue a jump command. As another example, if the machine learning model indicates a collision detection error, the dynamic test system 130 may instruct the front-end test system 104 to issue a command to move an object to, for example, determine if the collision error is repeated or to determine whether there is a point of intersection between the objects where the collision detection algorithm within the video game 112 begins to function to detect and prevent collisions between in-game objects. As illustrated by the above examples, in some cases, the dynamic test system 130 can control interaction with the video game 112 enabling the machine learning model to play the video game 112 or to emulate a human user interacting with the video game 112. Advantageously, in certain embodiments, the machine learning model can be used to at least partially automate testing of the video game 112. Moreover, the dynamic test system 130 can select actions to perform with respect to the video game 112 based on the state of the video game 112 as observed from one or more frames provided to the dynamic test system 130 and/or the machine learning model.

In some embodiments, the resultant action may include training or fine-tuning the machine learning model based on the captured frames of the video game 112 and the results of applying the frames and/or prompts to the machine learning model.

In some embodiments, the resultant action may include providing a command to the front-end test system 104 to cause the front-end test system 104 to pause or unpause the video game 112.

At block 218, the dynamic test system 130 executes the resultant action. Executing the resultant action may include sending a command to the front-end test system 104 to be provided to the video game 112, initiating the error resolution process, alerting a user, or any other action associated with the selected resultant action. In some cases, executing the resultant action may include providing an identify of an instruction or a command to the video game test system 102 to be executed with respect to the video game 112.

Example Machine Learning Fine-Tuning Process

FIG. 3 presents a flowchart of a machine learning fine-tuning process 300 in accordance with certain embodiments. The process 300 can be implemented by any system that can train and/or fine-tune a machine learning model, such as a Large Language Model (LLM), to detect coding errors in a video game 112. The process 300, in whole or in part, can be implemented by, for example, a video game test system 102, a front-end test system 104, a back-end test system 106, a dynamic test system 130, a test engine 136, or a machine learning training system 140, among others. Although any number of systems, in whole or in part, can implement the process 300, to simplify discussion, the process 300 will be described with respect to particular systems.

The process 300 begins at block 302 where the machine learning training system 140 receives a set of training data corresponding to the video game 112 under test. The training data may be specific to the video game 112, associated with a genre (e.g., sports games, soccer games, adventure games, side scroller games, role playing games, etc.) of video games that includes the video game 112, associated with a particular game series (e.g., a particular series of fighting games, previous releases of a football game released each year, a past release of a particular RPG game series, etc.) that includes the video game 112, associated with a particular game engine that may be used by the video game 112 and possibly among other games, generic to any video game, associated with video games of the developer of the video game 112, or any other classification that encompasses the video game 112.

In some cases, the training data is curated data that is selected to include both training data without coding errors and training data with coding errors. Moreover, the training data may include images or frames of animation that depict animation generated by a training source (e.g., a video game or game engine) without a coding error and images or frames of animation that depict animation generated by a training source with a coding error. In some cases, at least some of the training data may be obtained from software other than video games that may produce animations, such as educational software. In addition to images, in some cases, the training data may include audio, haptic responses, or other types of data that may be output by a user computing system hosting a video game and utilized by an anomaly detection system to determine whether a video game includes a coding error.

The training data may include labelled data, unlabeled data, or both labelled and unlabeled data. The labelled data may include labels that indicate whether the data represents error-free images or images that depict errors. Further, the labels may indicate types of errors and/or examples of images that lack the specific type of error. For example, images that depict objects with missing textures may be labeled to indicate a texture issue or a missing texture.

In some cases, the training data may indicate physics rules being applied in the video game that generates the training data images. For example, an image that depicts a character jumping an unrealistic height may be labelled to indicate the gravity being used and/or that the image is associated with error free code. As can be seen from this example, because video game physics may not match real-world physics, in some cases, it is desirable to have training data that can fine-tune models to recognize the in-game physics rather than real world physics.

At block 304, the machine learning training system 140 preprocesses the set of training data. Preprocessing the set of training data may include filtering the training data to select training data associated with a particular video game, video game genre or series, video game engine, or any other basis for filtering the training data. In some cases, preprocessing the set of training data may include standardizing or normalizing the training data. For example, images included in the training data may be normalized to a particular resolution or image size. In some embodiments, the block 304 may be optional or omitted. For example, the training data may already be curated, and thus, it may be unnecessary to further filter the training data.

At block 306, the machine learning training system 140 receives an objective function corresponding to the coding errors to be detected. For example, the objective function may relate to minimizing errors in the detection of visual anomalies. As another example, the object function may relate to minimizing errors in image segmentation or image generation.

At block 308, the machine learning training system 140 trains, or fine-tunes, a selected machine learning model using the set of training data and the objective function. In some embodiments, the machine learning model is a pre-trained model. In many such cases, the machine learning model is pretrained using real-world data. For example, the machine learning model may have been trained using images that reflect real-world objects and real-world physics rules. As may video games include non real-world objects or include non-realistic representations of real-world objects, it is desirable to fine-tune or adjust the training of the machine learning model to more accurately represent the objects within the video game world. Similarly, as the physics applied in the video game may not accurately reflect real-world physics, it may be desirable to fine-tune or adjust the training of the machine learning model to more accurately reflect the in-game physics.

At block 310, the machine learning training system 140 stores the trained machine learning model at the dynamic test system 130. Alternatively, or in addition, the machine learning model may be stored at another system accessible by the dynamic test system 130. For example, the machine learning model may be stored at a data center that includes one or more inference servers that enable access to the machine learning model. In some embodiments, the block 310 may be optional or omitted. For example, the machine learning training system 140 may fine-tune a machine learning model already stored at a data center or other host of the machine learning model.

At block 312, the machine learning training system 140 updates training, or fine-tuning, of the machine learning model based at least in part on a result of testing the video game 112 under test. For example, an output of the process 200 may indicate that one or more frames indicates an error or does not indicate an error with respect to the video game 112. In some such cases, a user may verify the accuracy of the output of the machine learning model during implementation of the process 200 and may supply the frame along with a label indicating whether the frame depicts a coding error (or the type of error) to be used as part of updated training data, which can be used to further fine-tune the machine learning model using, for example, the process 300. In some embodiments, the block 312 may be optional or omitted.

It should be understood that operations associated with the process 200 and/or the process 300 may be performed in a different order, serially, or at least partially in parallel. For example, operations associated with the block 302 may be performed subsequent or at least partially in parallel to operations associated with the block 306.

Example Output Frame with Embedded Data

Figure 4:
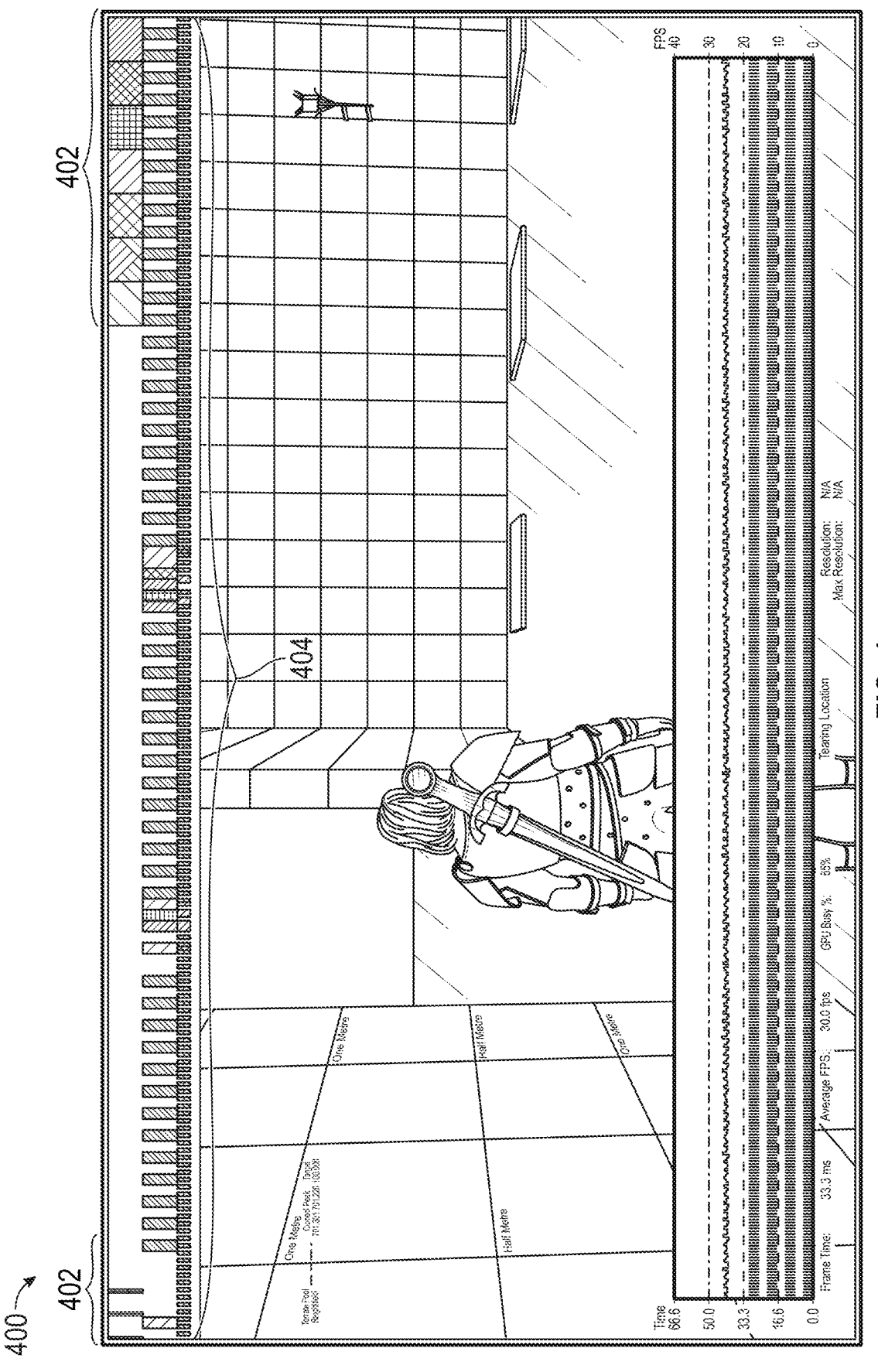
FIG. 4 illustrates an example output frame including embedded data in accordance with certain embodiments.

FIG. 4 illustrates an example output frame 400. The output frame 400 may be one of a set of frames generated in response to a state of the video game 112. In the depicted example, the walls and floor may be missing textures. Applying the output frame 400 to the machine learning model along with one or more prompts using the process 200 can be used to automatically determine that there are missing textures. Moreover, the process 200 can be used to dynamically prompt the machine learning model to detect the existence of a coding error and the type of coding error. For example, the initial prompt may be used to determine whether there is a visual anomaly. A second prompt may be used to determine that the visual anomaly relates to graphics rather than a physics or collision detection error. And a third prompt may be used to determine the location of the visual anomaly.

In some embodiments, as illustrated in FIG. 4, the output frame 400 may include embedded data. The output frame 400 may be one frame of an animation that is output by a video game 112. This animation may be part of a video or non-interactive animation being played or may be part of an interactive scene that changes in response to inputs from a user. A portion of the output frame 400 may be configured to include embedded data that has been inserted into the frame 400 by an API, SDK, or library used during the development of the video game 112. This portion of the output frame may be a particular set of pixels designated to have certain colors or opaqueness values that correspond to information that the developer wants to obtain from the video game 112. This information may be the occurrence or triggering of an event within the video game 112. This portion of the frame 400 may be referred to as the payload 402 and the embedded information may be referred to as the payload data.

In certain embodiments, different colors or opaqueness values may indicate different information or the occurrence of different events within the video game 112. Similarly, different pixels within the payload 402 may be associated with different events being monitored. It should be understood that the payload 402 of the frame 400 is an example medium of communication that identifies the event that has been triggered by, for example, a received command. However, the event may or may not be the occurrence of the animation or frame of the animation itself. For example, the event may be the setting of a particular state within the video game 112 that may not be visible to a user, such as the adding of an item to a character's inventory. Although a user may access the inventory to see the item, the inventory may not necessarily be displayed at the time that the item is added to the inventory. A tester may want to determine how quickly the item is added to the user's inventory when the user interacts with the item to pick it up. As another example, the event may be the playing of a sound or the shooting of an enemy that is not visible at a particular point in time when the projectile hits the enemy.

In some embodiments, there may be different payloads 402 allocated for different types of information to be communicated to a tester. For example, the embedded information at the top of the output frame 400 may be associated with the triggering of different events within the video game 112. Whereas the payload 404 may represent a frame identifier that can be used to help determine a frame rate. This frame rate information may be used to help determine latency. For example, each tick within the illustrated payload 404 may represent a frame. A different tick, starting from the left end of the output frame 400, may be highlighted for each frame as the active tick. In some cases, the active tick may be reset to the first tick starting from the left end every second. Thus, if the active tick reaches the $60^{th}$ tick at the end of a second, it can be determined that the video game 112 is generated 60 FPS. If the ticks reach the 30th tick at the end of a second, it can be determined that the video game 112 is generating 30 FPS, which in some cases may indicate a coding or design error if the video game 112 is expected to generate 60 FPS.

Although the pixels that include the embedded data are visible in FIGS. 4, it should be understood that the pixels that include the embedded data may in some cases not be visible. For example, the pixels may be few enough in number to not be visible to an observer. As another example, the pixels with the embedded data may blend into the animation frame being displayed.

Overview of Computing System

Figure 5:
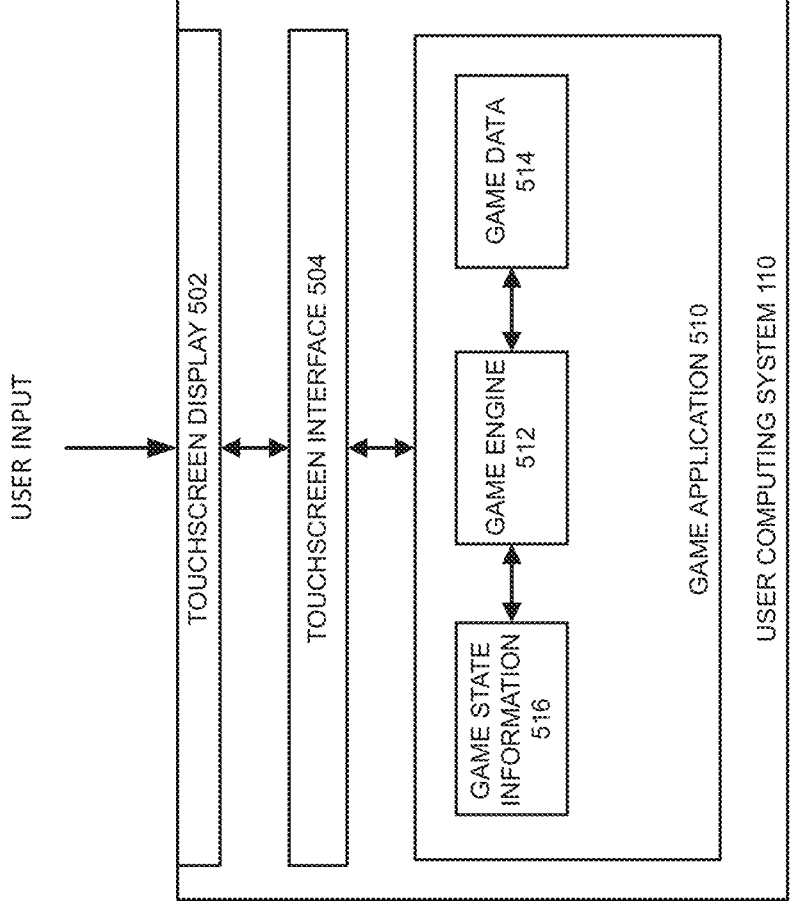
FIG. 5 illustrates an embodiment of a user computing system.

FIG. 5 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 5, the user computing system 110 is a touch-capable computing device capable of receiving input from a user via a touchscreen display 502. However, the user computing system 110 is not limited as such and may include non-touch capable embodiments, which do not include a touchscreen display 502.

The user computing system 110 includes a touchscreen display 502 and a touchscreen interface 504, and is configured to execute a game application 510. This game application may be the video game 112 or an application that executes in conjunction with or in support of the video game 112, such as a video game execution environment. Although described as a game application 510, in some embodiments the application 510 may be another type of application that may have a variable execution state based at least in part on the preferences or capabilities of a user, such as educational software. While user computing system 110 includes the touchscreen display 502, it is recognized that a variety of input devices may be used in addition to or in place of the touchscreen display 502.

The user computing system 110 can include one or more processors, such as central processing units (CPUs), graphics processing units (GPUs), and accelerated processing units (APUs). Further, the user computing system 110 may include one or more data storage elements. In some embodiments, the user computing system 110 can be a specialized computing device created for the purpose of executing game applications 510. For example, the user computing system 110 may be a video game console. The game applications 510 executed by the user computing system 110 may be created using a particular application programming interface (API) or compiled into a particular instruction set that may be specific to the user computing system 110. In some embodiments, the user computing system 110 may be a general purpose computing device capable of executing game applications 510 and non-game applications. For example, the user computing system 110 may be a laptop with an integrated touchscreen display or desktop computer with an external touchscreen display. Components of an example embodiment of a user computing system 110 are described in more detail with respect to FIG. 6.

The touchscreen display 502 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 502. The touchscreen interface 504 can be configured to translate the touch input into data and output the data such that it can be interpreted by components of the user computing system 110, such as an operating system and the game application

510. The touchscreen interface 504 can translate characteristics of the tactile touch input touch into touch input data. Some example characteristics of a touch input can include, shape, size, pressure, location, direction, momentum, duration, and/or other characteristics. The touchscreen interface 504 can be configured to determine the type of touch input, such as, for example a tap (for example, touch and release at a single location) or a swipe (for example, movement through a plurality of locations on touchscreen in a single touch input). The touchscreen interface 504 can be configured to detect and output touch input data associated with multiple touch inputs occurring simultaneously or substantially in parallel. In some cases, the simultaneous touch inputs may include instances where a user maintains a first touch on the touchscreen display 502 while subsequently performing a second touch on the touchscreen display 502. The touchscreen interface 504 can be configured to detect movement of the touch inputs. The touch input data can be transmitted to components of the user computing system 110 for processing. For example, the touch input data can be transmitted directly to the game application 510 for processing.

In some embodiments, the touch input data can undergo processing and/or filtering by the touchscreen interface 504, an operating system, or other components prior to being output to the game application 510. As one example, raw touch input data can be captured from a touch input. The raw data can be filtered to remove background noise, pressure values associated with the input can be measured, and location coordinates associated with the touch input can be calculated. The type of touch input data provided to the game application 510 can be dependent upon the specific implementation of the touchscreen interface 504 and the particular API associated with the touchscreen interface 504. In some embodiments, the touch input data can include location coordinates of the touch input. The touch signal data can be output at a defined frequency. Processing the touch inputs can be computed many times per second and the touch input data can be output to the game application for further processing.

A game application 510 can be configured to be executed on the user computing system 110. The game application 510 may also be referred to as a video game, a game, game code and/or a game program. A game application should be understood to include software code that a user computing system 110 can use to provide a game for a user to play. A game application 510 might comprise software code that informs a user computing system 110 of processor instructions to execute, but might also include data used in the playing of the game, such as data relating to constants, images and other data structures. For example, in the illustrated embodiment, the game application includes a game engine 512, game data 514, and game state information 516.

The touchscreen interface 504 or another component of the user computing system 110, such as the operating system, can provide user input, such as touch inputs, to the game application 510. In some embodiments, the user computing system 110 may include alternative or additional user input devices, such as a mouse, a keyboard, a camera, a game controller, and the like. A user can interact with the game application 510 via the touchscreen interface 504 and/or one or more of the alternative or additional user input devices. The game engine 512 can be configured to execute aspects of the operation of the game application 510 within the user computing system 110. Execution of aspects of gameplay within a game application can be based, at least in part, on the user input received, the game data 514, and game state information 516. The game data 514 can include game rules, prerecorded motion capture poses/paths, environmental settings, constraints, animation reference curves, skeleton models, and/or other game application information. Further, the game data 514 may include information that is used to set or adjust the difficulty of the game application 510.

The game engine 512 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 510, the game application 510 can store game state information 516, which can include character states, environment states, scene object storage, and/or other information associated with a state of execution of the game application 510. For example, the game state information 516 can identify the state of the game application at a specific point in time, such as a character position, character action, game level attributes, and other information contributing to a state of the game application.

The game engine 512 can receive the user inputs and determine in-game events, such as actions, collisions, runs, throws, attacks and other events appropriate for the game application 510. During operation, the game engine 512 can read in game data 514 and game state information 516 in order to determine the appropriate in-game events. In one example, after the game engine 512 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 6:
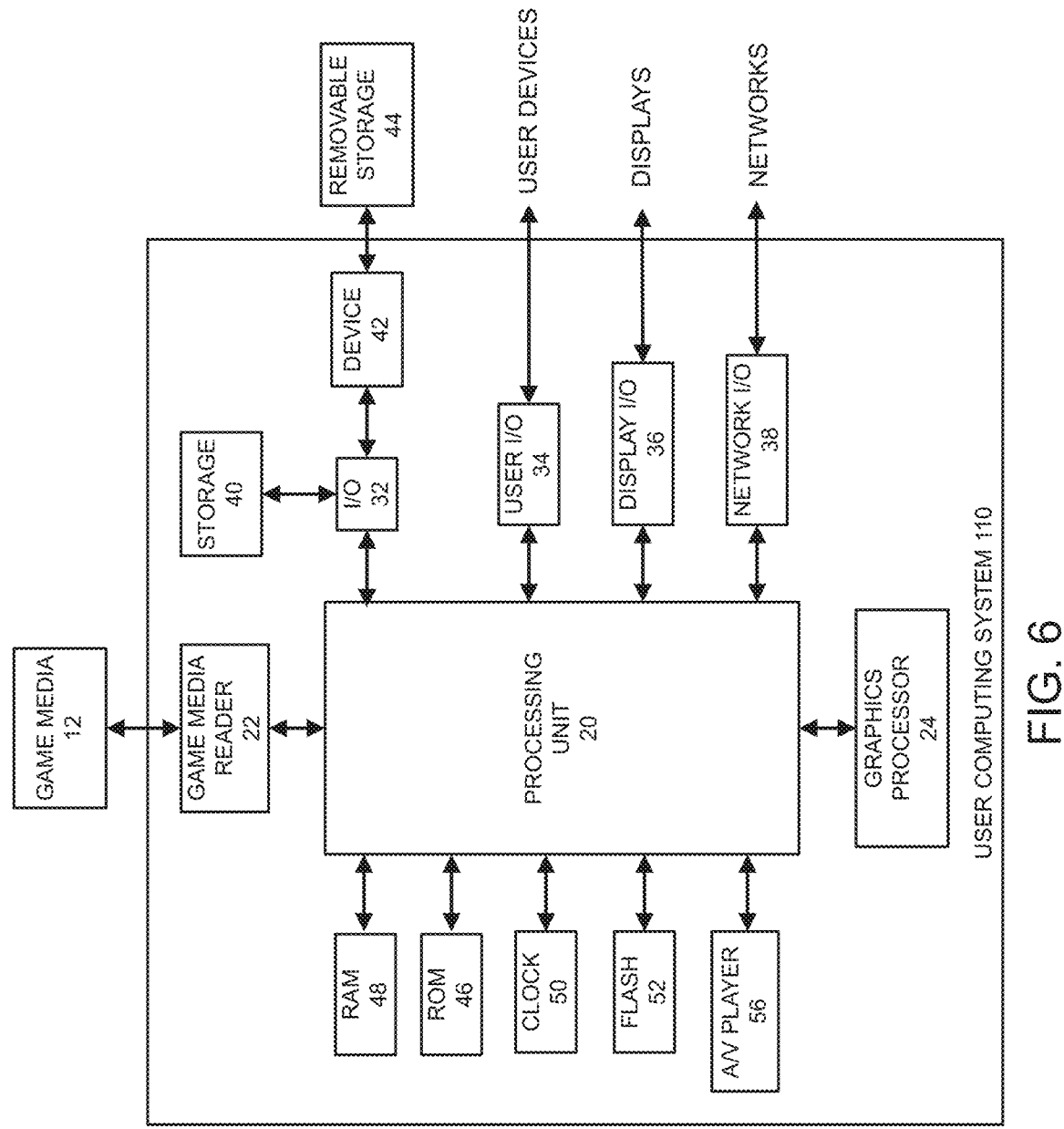
FIG. 6 illustrates an embodiment of a hardware configuration for the user computing system of FIG. 5.

FIG. 6 illustrates an embodiment of a hardware configuration for the user computing system 110 of FIG. 5. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 6) as described with respect to FIG. 5, the user computing system 110 may optionally include a touchscreen display 502 and a touchscreen interface 504.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for user computing system 110. Processing unit 20 can communicate through I/O 32 to store data, such as game state data and any shared data files. In addition to storage 40 and removable storage media 44, user computing system 110 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

ADDITIONAL EMBODIMENTS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A visual anomaly detection system configured to detect a coding error in a video game under test, the visual anomaly detection system comprising:

a dynamic test system configured to process one or more frames of the video game under test using a machine learning model to detect the coding error in the video game under test; and a video game test system configured to receive video output signals from a user computing system that executes an instance of the video game under test, the video game test system comprising:

a display signal input configured to receive the video output signals from the user computing system; and a controller implemented using one or more hardware processors, the controller configured to:

access a first instruction that emulates a first interaction by a user with a user interface device of the user computing system executing the instance of the video game under test;

provide a first control signal that corresponds to the first instruction to the user interface device causing the user interface device to emulate the first interaction by the user with the user interface device;

responsive to providing the first control signal to the user interface device, receive a first set of video output signals at the display signal input from a display output port of the user computing system;

convert the first set of video output signals to a first set of pixels corresponding to a first frame generated by the video game under test; and provide the first frame to the dynamic test system, wherein the dynamic test system is further configured to:

receive the first frame from the video game test system;

generate a first dynamic prompt for the machine learning model, the first dynamic prompt corresponding to identifying a first type of coding error within the video game under test;

apply the first dynamic prompt and the first frame to the machine learning model;

receive a first output from the machine learning model;

determine a first resultant action based on the first output of the machine learning model; and execute the first resultant action.

2. The video game test system of claim 1, wherein the first instruction is selected based on a prior output generated from applying a prior dynamic prompt or a prior frame to the machine learning model.

3. The video game test system of claim 1, wherein determining the first resultant action comprises:

determining whether the first output of the machine learning model indicates an existence of an anomaly within the first frame, wherein the anomaly corresponds to the first type of coding error; and selecting the first resultant action based on the determination of the existence of the anomaly within the first frame.

4. The video game test system of claim 3, wherein the first resultant action comprises initiating a coding error resolution process.

5. The video game test system of claim 1, wherein the first resultant action comprises initiating testing of a second frame corresponding to a second set of pixels obtained from a second set of video output signals.

6. The video game test system of claim 1, wherein the first resultant action comprises performing additional testing on the first frame, and wherein executing the first resultant action comprises:

generating a second dynamic prompt for the machine learning model, the second dynamic prompt corresponding to identifying a second type of coding error within the video game under test;

applying the second dynamic prompt and the first frame to the machine learning model;

receiving a second output from the machine learning model;

determining a second resultant action based on the second output of the machine learning model; and executing the second resultant action.

7. The video game test system of claim 1, wherein the first resultant action comprises an interaction with the video game under test, and wherein executing the first resultant action comprises:

selecting a second instruction that emulates a second interaction by the user with the user interface device of the user computing system executing the video game under test; and providing an identity of the second instruction to the video game test system, wherein the video game test system:

provides a second control signal that corresponds to the second instruction to the user interface device causing the user interface device to emulate the second interaction by the user with the user interface device;

responsive to providing the second control signal to the user interface device, receive a second set of video output signals at the display signal input from the display output port of the user computing system;

convert the second set of video output signals to a second set of pixels corresponding to a second frame generated by the video game under test; and provide the second frame to the dynamic test system.

8. The video game test system of claim 1, wherein the dynamic test system is further configured to update the machine learning model based at least in part on the first frame.

9. The video game test system of claim 1, wherein the controller is further configured to issue a pause command to pause the instance of the video game for at least a portion of the time that the dynamic test system processes the first frame.

10. A video game test system configured to test an instance of a video game under test, the video game test system comprising:

a display signal input configured to receive video output signals from a user computing system that executes the instance of the video game under test; and a controller implemented using one or more hardware processors, the controller configured to:

access a first instruction that emulates a first interaction by a user with a user interface device of the user computing system executing the instance of the video game under test;

provide a first control signal that corresponds to the first instruction to the user interface device causing the user interface device to emulate the first interaction by the user with the user interface device;

responsive to providing the first control signal to the user interface device, receive a first set of video output signals at the display signal input from a display output port of the user computing system;

convert the first set of video output signals to a first set of pixels corresponding to a first frame generated by the video game under test; and provide the first frame to a dynamic test system configured to process one or more frames of the instance of the video game under test using a machine learning model to detect coding errors in the video game under test.

11. The video game test system of claim 10, wherein the controller is further configured to receive a first output of the dynamic test system corresponding to processing the first frame using the machine learning model.

12. The video game test system of claim 11, wherein the controller is further configured to select a second instruction that emulates a second interaction by the user with the user interface device of the user computing system executing the video game under test based at least in part on the first output of the dynamic test system.

13. The video game test system of claim 11, wherein the controller is further configured to pause execution of the instance of the video game at least until the first output of the dynamic test system is received.

14. The video game test system of claim 11, wherein the controller is further configured to initiate a coding error resolution process in response to determining that the first output indicates an existence of a coding error.

15. The video game test system of claim 10, further comprising a transceiver configured to transmit the first frame to the dynamic test system.

16. The video game test system of claim 10, wherein the controller is further configured to provide a second frame to the dynamic test system, wherein the second frame occurs a threshold number of frames subsequent to the first frame, wherein the threshold number of frames is more than one, and wherein the second frame is a next frame provided to the dynamic test system after the first frame.

17. A computer-implemented method of detecting an error in a video game under test, the computer-implemented method comprising:

obtaining a first instruction that emulates a first interaction by a user with a user interface device of a user computing system executing an instance of the video game under test;

providing a first control signal that corresponds to the first instruction to the user interface device causing the user interface device to emulate the first interaction by the user with the user interface device;

responsive to providing the first control signal to the user interface device, receiving a first set of video output signals at a display signal input port from a display output port of the user computing system;

converting the first set of video output signals to a first set of pixels corresponding to a first frame generated by the video game under test;

generating a first prompt for a machine learning model corresponding to identifying a first type of error within the video game under test;

applying the first prompt and the first frame to the machine learning model;

receiving a first output from the machine learning model; and triggering a resultant action based at least in part on the first output.

18. The computer-implemented method of claim 17, further comprising determining that the first output indicates an existence of the first type of error within the video game under test, wherein triggering the resultant action comprises triggering an error resolution process.

19. The computer-implemented method of claim 17, further comprising determining that the first output does not indicate an existence of the first type of error within the video game under test, wherein triggering the resultant action comprises triggering generation of a second prompt for the machine learning model corresponding to identifying a second type of error within the video game under test.

20. The computer-implemented method of claim 17, further comprising determining that the first output does not indicate an existence of the first type of error within the video game under test, wherein triggering the resultant action comprises applying the first prompt and a second frame to the machine learning model.

* * * * *